United States Patent
Song et al.

(10) Patent No.: US 9,497,454 B2
(45) Date of Patent: Nov. 15, 2016

(54) METHOD AND DEVICE FOR ENCODING/DECODING IMAGE USING FEATURE VECTORS OF SURROUNDING BLOCKS

(71) Applicant: SK TELECOM CO., LTD., Seoul (KR)

(72) Inventors: Jinhan Song, Seoul (KR); Jeongyeon Lim, Seongnam-si (KR); Hyuk Lee, Seoul (KR); Jechang Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 650 days.

(21) Appl. No.: 13/928,703

(22) Filed: Jun. 27, 2013

(65) Prior Publication Data
US 2013/0287094 A1    Oct. 31, 2013

Related U.S. Application Data

(63) Continuation of application No. PCT/KR2011/010254, filed on Dec. 28, 2011.

(30) Foreign Application Priority Data

Dec. 28, 2010 (KR) .................. 10-2010-0136400

(51) Int. Cl.
*H04N 19/105* (2014.01)
*H04N 19/11* (2014.01)
(Continued)

(52) U.S. Cl.
CPC ...... *H04N 19/00024* (2013.01); *H04N 19/105* (2014.11); *H04N 19/11* (2014.11); *H04N 19/147* (2014.11); *H04N 19/176* (2014.11)

(58) Field of Classification Search
CPC ............ H04N 19/00024; H04N 19/105; H04N 19/11; H04N 19/147; H04N 19/176
(Continued)

(56) References Cited

U.S. PATENT DOCUMENTS

| | | | |
|---|---|---|---|
| 2008/0317131 A1* | 12/2008 | Lee | ............ H04N 19/176 375/240.16 |
| 2011/0249739 A1* | 10/2011 | Liu | ............ H04N 19/176 375/240.12 |

(Continued)

FOREIGN PATENT DOCUMENTS

| | | |
|---|---|---|
| CN | 101854551 A | 10/2010 |
| KR | 1020080025244 | 3/2008 |

(Continued)

OTHER PUBLICATIONS

Byeongdu La, Jinwoo Jeong and Yoonsik Choe, "Most probable mode-based fast 4×4 intra-prediction in H.264/AVC," Signal Processing and Communication Systems, 2008. ICSPCS 2008. 2nd International Conference on, Gold Coast, 2008, pp. 1-4. doi: 10.1109/ICSPCS.2008.4813752.*

(Continued)

*Primary Examiner* — William C Vaughn, Jr.
*Assistant Examiner* — Jae N Noh
(74) *Attorney, Agent, or Firm* — Hauptman Ham, LLP

(57) ABSTRACT

A video encoding apparatus, a decoding apparatus and method thereof by using feature vectors of at least one neighboring block are provided. In the video encoding apparatus, the decoding apparatus and the method, the feature vector is extracted from pixels of at least one neighboring block, and an optimal prediction mode represented by the feature vector is extracted with reference to a preset feature vector distribution of image blocks. The extracted optimal prediction mode is decided as a most (Continued)

probable mode (MPM) or an intra mode of a current block, and the current block is intra-predicted and encoded or decoded by using pixels of the at least one neighboring block adjacent to the current block.

8 Claims, 7 Drawing Sheets

(51) Int. Cl.
  *H04N 19/176* (2014.01)
  *H04N 19/147* (2014.01)
(58) Field of Classification Search
  USPC .......................................... 375/240.02, 240.2
  See application file for complete search history.

(56) References Cited

U.S. PATENT DOCUMENTS

| 2011/0292994 | A1* | 12/2011 | Lim ..................... H04N 19/182 375/240.02 |
| 2012/0008676 | A1* | 1/2012 | Lee ...................... H04N 19/137 375/240.02 |
| 2012/0082223 | A1* | 4/2012 | Karczewicz ......... H04N 19/196 375/240.12 |
| 2012/0224777 | A1* | 9/2012 | Kim ........................ H04N 7/26 382/238 |

FOREIGN PATENT DOCUMENTS

| KR | 1020090066035 | 6/2009 |
| KR | 1020100000011 | 1/2010 |

OTHER PUBLICATIONS

Ken McCann et al., "Samsung's Response to the Call for Proposals on Video Compression Technology", JCTVC-A124, pp. 1-40, Apr. 15-23, 2010.

International Search Report mailed Jul. 31, 2012 for PCT/KR2011/010254.

* cited by examiner

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

FIG. 3

| $A_3$ | $B_3$ | $C_3$ | $D_3$ |
|---|---|---|---|
| $A_2$ | $B_2$ | $C_2$ | $D_2$ |
| $A_1$ | $B_1$ | $C_1$ | $D_1$ |
| $A_0$ | $B_0$ | $C_0$ | $D_0$ |
| a | b | c | d |
| e | f | g | h |
| i | j | k | l |
| m | n | o | p |

Upper Block: rows 1–4
Current Block: rows 5–8

*FIG. 6*

METHOD AND DEVICE FOR ENCODING/DECODING IMAGE USING FEATURE VECTORS OF SURROUNDING BLOCKS

CROSS-REFERENCE TO RELATED APPLICATION

The present application is a continuation of International Patent Application No. PCT/KR2011/010254, filed Dec. 28, 2011, which is based on and claims priority to Korean Patent Application No. 10-2010-0136400, filed on Dec. 28, 2010. The disclosures of the above-listed applications are hereby incorporated by reference herein in their entirety.

FIELD

The present disclosure relates to an apparatus and a method for encoding and/or decoding images by using feature vectors of at least one neighboring (or adjacent, or surrounding) block.

BACKGROUND

The statements in this section merely provide background information related to the present disclosure and may not constitute prior art.

Following the development of information and communication technology, including the Internet, communication is on the rise in the form of video as well as text and voice. Users unsatisfied with existing text-oriented communication services are being offered an increasing number of multimedia services encompassing texts, images, music, and various types of information. The enormous quantity inherent to multimedia data calls for larger storage capacities and broader bandwidths. Therefore, compression coding technologies have become a requisite in transmitting multimedia data including text, video and audio.

A basic principle of data compression includes a process of removing data redundancy. Data can be compressed by removing spatial redundancy such as a case where the same colors or objects are repeated in an image, temporal redundancy such as a case where adjacent frames are hardly changed in a video frame or a case where the same notes are repeated in an audio, or psychological vision redundancy considering the fact that human's visual and perceptive abilities are insensitive to high frequencies.

As compared with the existing MPEG-4 (Moving Picture Experts Group-4), the latest H.264/AVC (Advanced Video Coding) video compression method has attracted much attention because of its high compression efficiency. As one of schemes for improving compression efficiency, H.264 uses a directional intra prediction (hereinafter, simply referred to as an intra prediction) in order to remove spatial redundancy from each frame.

SUMMARY

In accordance with some embodiments of the present disclosure, a video encoding apparatus comprises an intra prediction encoder, a feature vector extractor and a prediction mode encoder. The intra prediction encoder is configured to perform an intra prediction and encoding on a current block by using pixels of at least one neighboring block adjacent to the current block. The feature vector extractor is configured to extract a feature vector from pixels of the at least one neighboring block. And the prediction mode encoder is configured to extract a prediction mode represented by the feature vector with reference to a preset feature vector distribution of image blocks, and to encode the extracted prediction mode as a prediction mode for an intra mode.

In accordance with some embodiments of the present disclosure, a video encoding apparatus comprises a feature vector extractor, a prediction mode decider and an intra prediction encoder. The feature vector extractor is configured to extract a feature vector from pixels of at least one neighboring block. The prediction mode decider is configured to decide a prediction mode represented by the feature vector as an intra mode of a current block with reference to a preset feature vector distribution of image blocks. And the intra prediction encoder is configured to perform an intra prediction and encoding in the intra mode by using pixels of the at least one neighboring block adjacent to the current block.

In accordance with some embodiments of the present disclosure, a video decoding apparatus comprises a feature vector extractor, a prediction mode decider and an intra prediction decoder. The feature vector extractor is configured to extract a feature vector from pixels of at least one neighboring block adjacent to a current block. The prediction mode decider is configured to decide a prediction mode represented by the feature vector as an intra mode of the current block with reference to a preset feature vector distribution of image blocks. And the intra prediction decoder is configured to generate a predicted block by performing an intra prediction in the intra mode by using the pixels of the at least one neighboring block, and to reconstruct the current block.

In accordance with some embodiments of the present disclosure, the video encoding apparatus performs a video encoding method and is configured to perform an intra prediction and encoding on a current block by using pixels of at least one neighboring block adjacent to the current block; extract a feature vector from the pixels of the at least one neighboring block; and extract an prediction mode represented by the feature vector with reference to a preset feature vector distribution of image blocks, and encode the optimal prediction mode as a prediction mode for an intra mode.

In accordance with some embodiments of the present disclosure, the video encoding apparatus performs a video encoding method and is configured to extract a feature vector from pixels of at least one neighboring block adjacent to a current block; decide a prediction mode represented by the feature vector as an intra mode of the current block with reference to a preset feature vector distribution of image blocks; and perform an intra prediction and encoding in the intra mode by using the pixels of the at least one neighboring block.

In accordance with some embodiments of the present disclosure, the video decoding apparatus performs a video decoding method and is configured to extract a feature vector from pixels of at least one neighboring block adjacent to a current block; decide a prediction mode represented by the feature vector as an intra mode of the current block with reference to a preset feature vector distribution of image blocks; and generate a predicted block by performing an intra prediction in the intra mode by using the pixels of the at least one neighboring block, and reconstructing the current block.

BRIEF DESCRIPTION OF DRAWINGS

FIG. 3 is an exemplary drawing of a labeling for describing nine prediction modes;

FIG. 6 is an exemplary drawing of pixels of a current block and pixels of a neighboring block;

DETAILED DESCRIPTION

Figure 1:
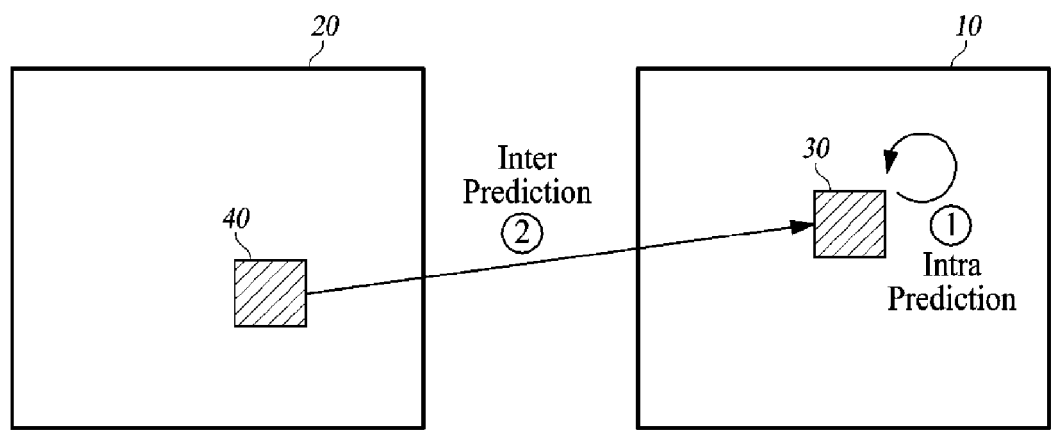
FIG. 1 is an exemplary drawing of an inter prediction (temporal prediction) scheme that performs prediction with reference to an area 40 of a frame 20 located at a different temporal position.

The present disclosure relates to encode and/or decode images by using feature vectors of at least one neighboring block (or adjacent block or surrounding block), and is directed to increase the likelihood of prediction effectiveness by predicting an intra mode with feature vectors of an image, leading to an improvement in the encoding and decoding efficiency of mode information.

Hereinafter, a video encoding apparatus and a video decoding apparatus described below may be user terminals such as a personal computer (PC), a notebook computer, personal digital assistant (PDA), portable multimedia player (PMP), PlayStation Portable (PSP), wireless communication terminal, smart phone, TV and the like, or server terminals such as an application server, service server and the like, and may refer to various apparatuses including a communication apparatus such as a communication modem and the like for performing communication with various types of devices or a wired/wireless communication network, memory for storing various types of programs and data for encoding or decoding a video, or performing an inter or intra prediction for the encoding or decoding, and a microprocessor and the like for executing the program to perform an operation and control.

Further, a video encoded into a bitstream by the video encoding apparatus may be transmitted in real time or non-real-time to the video decoding apparatus through wired/wireless communication networks such as the Internet, wireless personal area network (WPAN), wireless local area network (WLAN), WiBro (wireless broadband, aka WiMax) network, mobile communication network and the like or through various communication interfaces such as a cable, a universal serial bus (USB) and the like, and thus decoded in the video decoding apparatus and reconstructed and reproduced as the video.

A video typically may include a series of pictures each of which is divided into predetermined areas, such as frames or blocks. When the area of the video is partitioned into blocks, the partitioned blocks may be classified into an intra block or an inter block depending on an encoding method. The intra block means a block that is encoded through an intra prediction coding method which generates a predicted block by predicting pixels of a current block using pixels of a reconstructed block that underwent previous encoding and decoding and then encodes a differential value between pixels of the predicted block and the pixels of the current block within a current picture where the current encoding is performed. The inter block means a block that is encoded through an inter prediction encoding which generates the predicted block by predicting the current block in the current picture through referencing one or more past pictures or future pictures and then encoding the differential value of the predicted block from the current block. Here, the picture that is referenced in encoding or decoding the current picture is called a reference picture.

The intra prediction scheme predicts values of a current subblock by a copy in a determined direction by using pixels adjacent in an upper direction and a left direction with respect to one sub-block, and encodes only differences between predicted values. FIG. 1 exemplarily shows an inter prediction (temporal prediction) scheme that performs predicting an area 40 of a frame 20 referring to area 30 of a frame 10 located at a different temporal position. As shown in FIG. 1, the intra prediction is complementary to the inter prediction. That is, the preferable prediction scheme of the two prediction schemes is selected according to an image to be encoded.

According to an existing intra prediction scheme based on the H.264 standard, a predicted block of a current block is generated based on another block having a previous coding order, and a value obtained by subtracting the predicted block from the current block is then coded. For a luma component, predicted blocks are generated in units of 4×4 blocks or 16×16 macro blocks. Nine prediction modes are selectable for each 4×4 block, and four prediction modes are selectable for each 16×16 macro block. A H.264 video encoder selects a prediction mode having the smallest difference between a current block and a predicted block for each block among the prediction modes.

Figure 2:
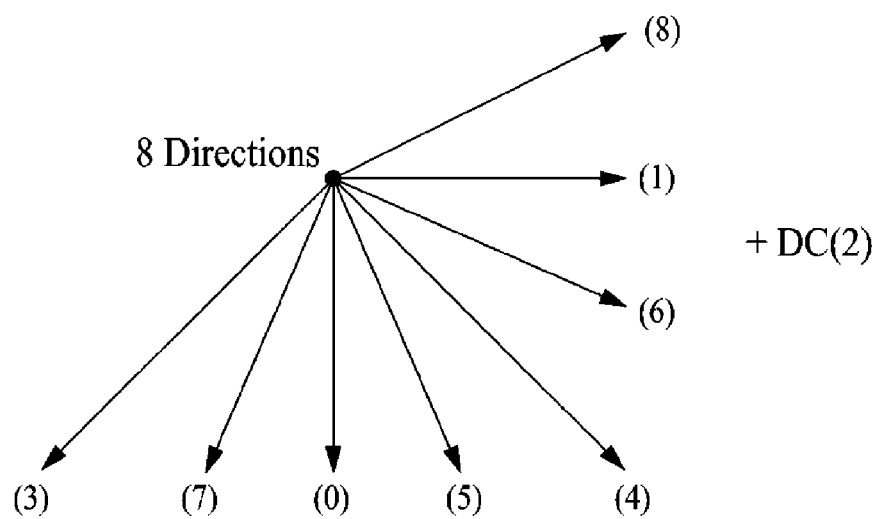
FIG. 2 is a drawing of nine intra modes including modes of eight directions and a DC mode.

As shown in FIG. 2, H.264 employs nine prediction modes, including modes (0, 1, and 3 to 8) of eight directions and a DC mode (2) using a mean value of eight adjacent pixels, as prediction modes for each 4×4 block.

Figure 3:
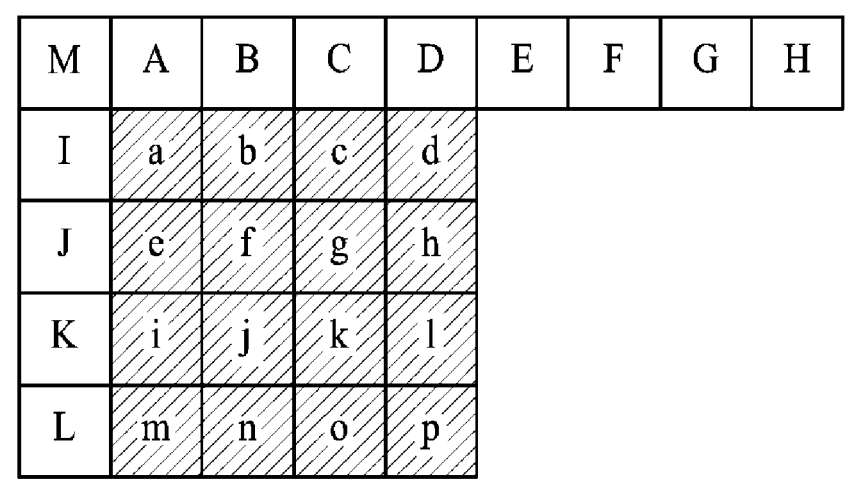

FIG. 3 shows an example of a labeling for describing the nine prediction modes. In this case, a predicted block of a current block (an area including a to p) is generated by using samples A to M decoded in advance. When the samples E, F, G and H cannot be decoded in advance, the samples E, F, G and H can be virtually generated by copying the sample D to the positions of the samples E, F, G and H.

Nine prediction modes will be described in detail with reference to FIG. 4. In the case of prediction mode 0, pixels of a predicted block are extrapolated in a vertical direction by using upper samples A, B, C and D. In the case of prediction mode 1, pixels of a predicted block are extrapolated in a horizontal direction by using left samples I, J, K and L. In the case of prediction mode 2, pixels of a predicted block are equally replaced with a mean of upper samples A, B, C and D, and left samples I, J, K and L.

In the case of prediction mode 3, pixels of a predicted block are interpolated at an angle of 45° between a lower-left direction and an upper-right direction. In the case of prediction mode 4, pixels of a predicted block are extrapolated at an angle of 45° in a lower-right direction. In the case of prediction mode 5, pixels of a predicted block are extrapolated at an angle of about 26.6° (width/height=1/2) in a vertical-right direction.

In the case of prediction mode 6, pixels of a predicted block are extrapolated at an angle of 26.6° in a horizontal-down direction. In the case of prediction mode 7, pixels of a predicted block are extrapolated at an angle of about 26.6° in a vertical-left direction. Lastly, in the case of prediction mode 8, pixels of a predicted block are interpolated at an angle of about 26.6° in a horizontal-up direction.

Figure 4:
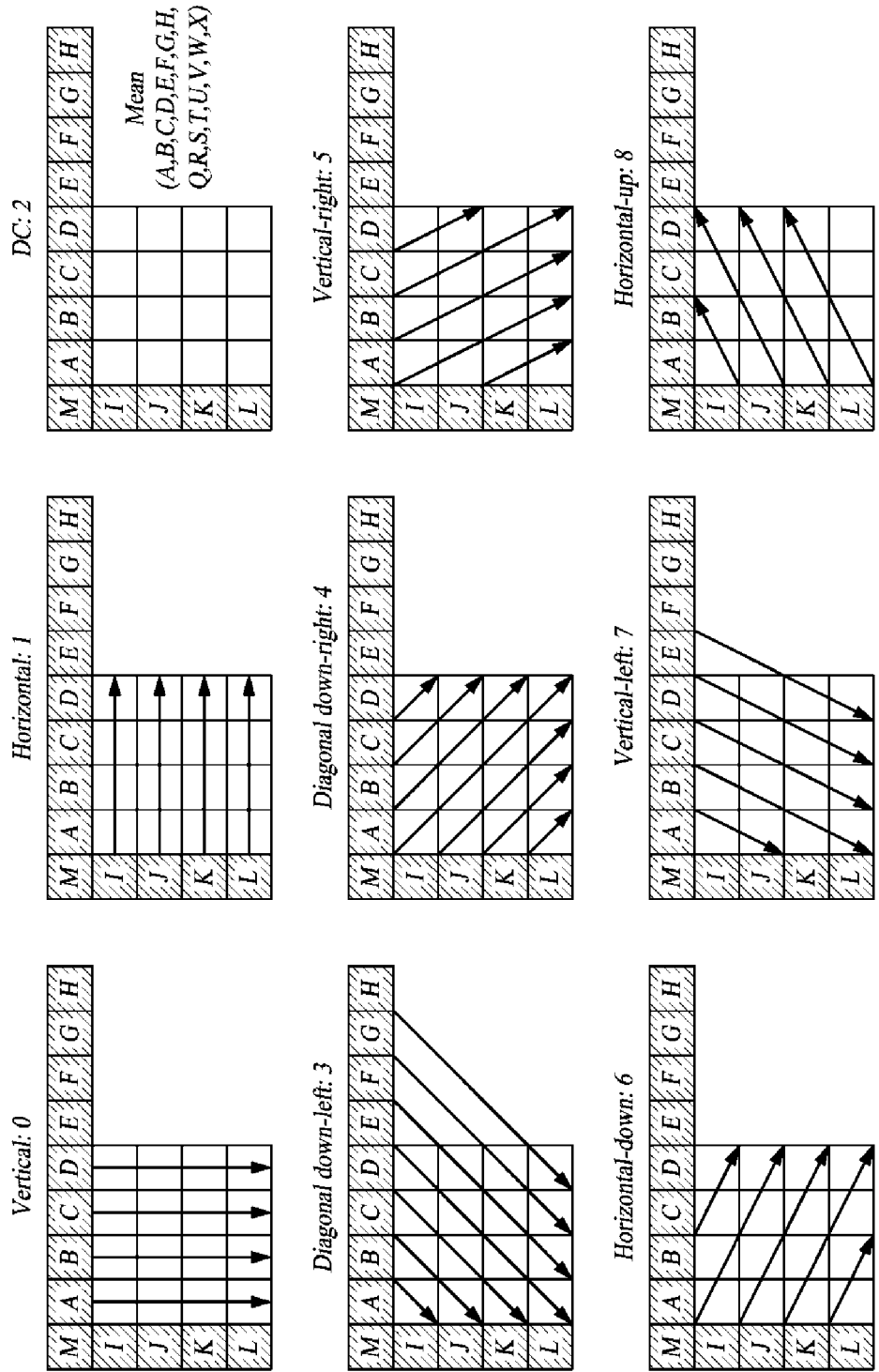
FIG. 4 is a drawing of nine intra modes.

Arrows of FIG. 4 indicate the prediction directions for the respective prediction modes. In the prediction modes 3 to 8, the samples of the predicted block can be generated from a weighted mean of reference samples A to M decoded in advance. For example, in the case of the prediction mode 4, the sample d located in an upper-right side of the predicted block shown in FIG. 3 can be predicted by Formula (1) below. In Equation (1), a round( ) function is a function of rounding off to the nearest whole number.

$$d=\text{round}(B/4+C/2+D/4) \quad \text{Formula (1)}$$

Meanwhile, 16×16 prediction models for luma components include four modes 0, 1, 2 and 3. In the case of the mode 0, pixels of a predicted block are extrapolated from upper samples. In the case of the mode 1, pixels of a predicted block are extrapolated from left samples. In the case of the mode 2, pixels of a predicted block are calculated by a mean of upper samples and left samples. Lastly, in the case of the mode 3, a linear "plane" function suitable for upper samples and left samples may be used. The mode 3 is more suitable for an area in which luma is smoothly changed.

As described above, after the intra prediction, it is necessary to encode the intra mode. In H.264, a prediction mode having a smaller mode number among prediction modes of a left block and an upper block of a current block is selected as a prediction mode. The inventor(s) has, therefore, noted that there is a need for a new method for compensating for prediction inaccuracy which may occur statistically.

Figure 5:
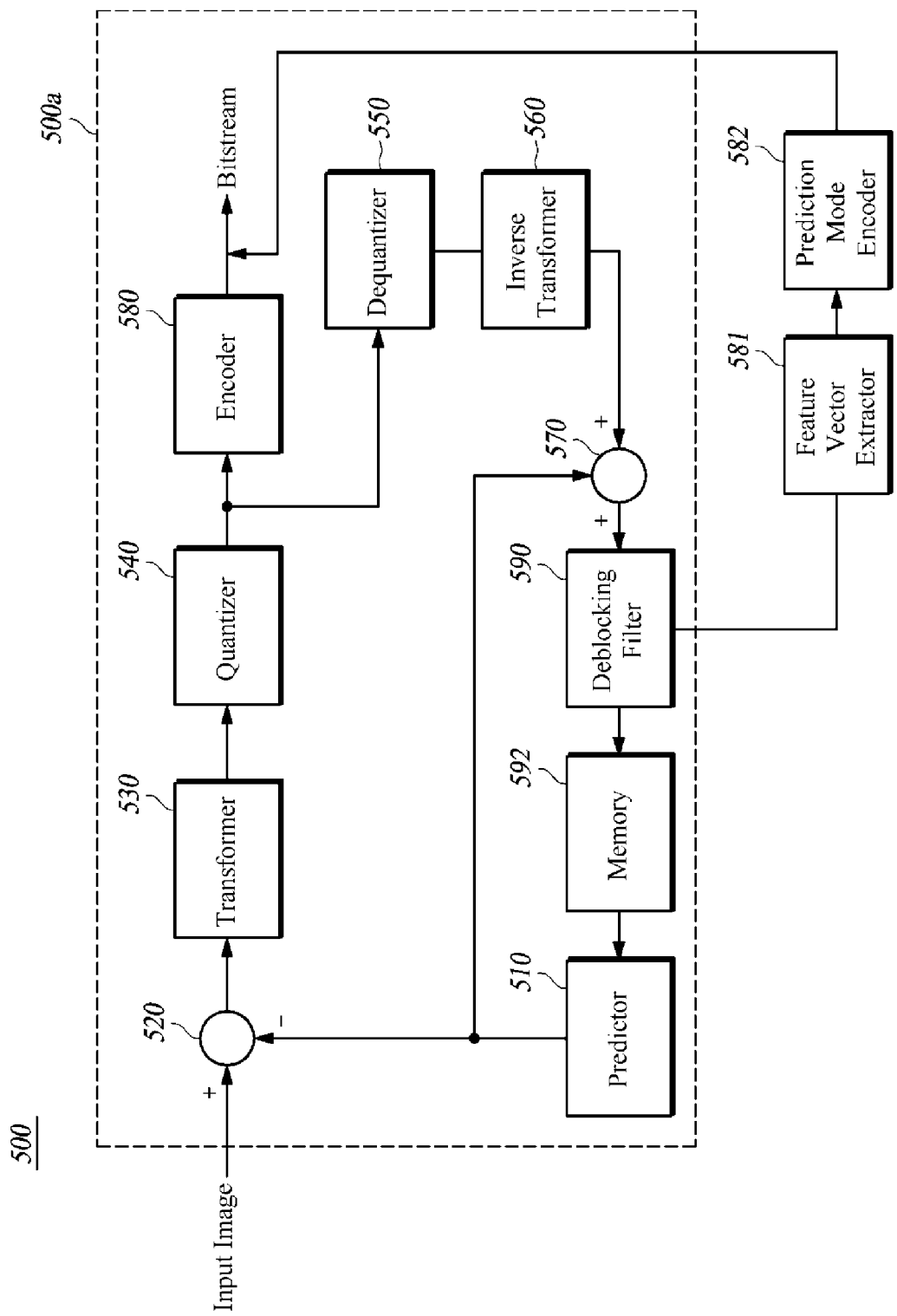
FIG. 5 is a schematic block diagram of a configuration of a video encoding apparatus according to one or more embodiments of the present disclosure.

FIG. 5 is a schematic block diagram of a configuration of a video encoding apparatus according to one or more embodiments of the present disclosure.

Referring to FIG. 5, the video encoding apparatus 500 may include a predictor 510, a subtractor 520, a transformer 530, a quantizer 540, a dequantizer 550, an inverse transformer 560, an adder 570, an encoder 580, a feature vector extractor 581, a prediction mode encoder 582, a deblocking filter 590, and a memory 592. A part of the above elements may not be necessarily included in the video encoding apparatus 500, and all or part of the above elements may be selectively included in the video encoding apparatus 500, depending on implementation. Meanwhile, an intra prediction encoder 500*a* according to one or more embodiments of the present disclosure performs an intra prediction and encoding on a current block by using pixels of at least one neighboring block adjacent to the current block. The intra prediction encoder 500*a* may be configured with the predictor 510, the subtractor 520, the transformer 530, the quantizer 540, the dequantizer 550, the inverse transformer 560, the adder 570, the encoder 580, the deblocking filter 590, and the memory 592. Other components of the video encoding apparatus 500, such as a predictor 510, a subtractor 520, a transformer 530, a quantizer 540, a dequantizer 550, an inverse transformer 560, an adder 570, an encoder 580, a feature vector extractor 581, and a prediction mode encoder 582 are implemented by one or more processors and/or application-specific integrated circuits (ASICs).

An input image to be encoded is input blockwise. In the present disclosure, a block has an M×N form. M and N may have various digits (i.e., number) in size, and M and N may be equal to or different from each other.

The predictor 510 generates a predicted block by predicting a block to be currently encoded in an image by using an intra prediction or inter prediction scheme. That is, in the case of using the intra prediction scheme, the predictor 510 predicts a pixel value of each pixel of the block to be encoded in the image according to a decided optimal prediction mode, and generates a predicted block having the predicted pixel value of each pixel. The optimal prediction mode may be a prediction mode having the lowest encoding cost among various intra modes for intra prediction (for example, in H.264/AVC, 9 nine prediction modes for each of intra 8×8 prediction and intra 4×4 prediction and four prediction modes for intra 16×16 prediction).

Referring to FIG. 2, in the case of the intra 4×4 prediction, there are nine prediction modes including a vertical mode, a horizontal mode, a direct current (DC) mode, a diagonal down-left mode, a diagonal down-right mode, a vertical-right mode, a horizontal-down mode, a vertical-left mode, and a horizontal-up mode. The predictor 510 may calculate the encoding costs of the respective prediction modes according to the block mode or block size of the block to be encoded, and determine a prediction mode having the lowest encoding cost as an optimal intra mode.

The subtractor 520 generates a residual block by subtracting the predicted block from the block to be encoded (that is, the current block). In other words, the subtractor 520 generates the residual block including a block-form residual signal by calculating a difference between the pixel value of each pixel of the block to be encoded and the predicted pixel value of each pixel of the predicted block predicted by the predictor 510.

The transformer 530 transforms each pixel value of the residual block into a frequency coefficient by transforming the residual block with a frequency domain. In this case, the transformer 530 can transform the residual signal with the frequency domain by using various transform methods (e.g., Hadamard transform, discrete cosine transform (DCT) based Transform, or the like) for transforming an image signal of a spatial domain with a frequency domain. In this case, the residual signal transformed with the frequency domain becomes the frequency coefficient.

The quantizer 540 quantizes the residual block having the frequency coefficient transformed with the frequency domain by the transformer 530. In this case, the quantizer 540 may quantize the transformed residual block by using a dead zone uniform threshold quantization (hereinafter, referred to as "DZUTQ"), a quantization weighted matrix, or an improved quantization method thereof.

The encoder 580 outputs a bitstream by encoding a quantized frequency coefficient string by using an entropy encoding scheme or the like. Entropy encoding scheme is a scheme that encodes a given set of symbols with the minimum number of bits to represent them. As such encoding technology, an entropy encoding technique may be used, but the present disclosure is not necessarily limited thereto, and various encoding techniques may also be used.

In addition, the encoder 580 can include not only the bit string generated by encoding the quantized frequency coefficients but also various pieces of information required to decode the encoded bit string in the encoded data. That is, the encoded data may include a coded block pattern (CBP), a delta quantization parameter, a bit string generated by encoding the quantized frequency coefficients, a bit sting for information necessary for prediction, and the like.

The dequantizer 550 dequantizes the residual block quantized by the quantizer 540. That is, the dequantizer 550 generates the residual block having the frequency coefficients by dequantizing the quantized frequency coefficients of the quantized residual block.

The inverse transformer 560 inversely transforms the residual block dequantized by the dequantizer 550. That is, the inverse transformer 560 generates (i.e., reconstructs) the residual block having pixel values, that is, the reconstructed residual block by inversely transforming the frequency coefficients of the dequantized residual block. In this case, the inverse transformer 560 may perform inverse transformation by inversely employing the transform method used by the transformer 530.

The adder 570 reconstructs the current block, that is, the target block, by adding the predicted block predicted by the predictor 510 and the residual block reconstructed by the inverse transformer 560. The reconstructed target block may pass through the deblocking filter 590. The deblocking filter 590 removes block distortion by performing deblocking filtering on the reconstructed current block. The memory 592 stores the deblocking-filtered current block, which is usable as a reference picture when a next block of the target block or other blocks are encoded.

The feature vector extractor 581 extracts feature vectors from the pixels of a neighboring block (or adjacent block, or surrounding block).

The prediction mode encoder 582 extracts an optimal prediction mode represented by the feature vectors with reference to a preset feature vector distribution of image blocks, and encodes the optimal prediction mode as a prediction mode of an intra mode.

Each of the feature vector extractor 581 and the prediction mode encoder 582 may be implemented as a module separate from the encoder 580, or may be implemented as a single module integrated with the encoder 580.

For example, in the intra 4×4 mode based on H.264, the feature vectors may include, but are not limited to, one or more of slopes of the neighboring block (or adjacent block), including a vertical slope, a horizontal slope, a diagonal down-right slope, a diagonal down-left slope, a horizontal-down (width/height ratio=1/2) slope, a horizontal-up (width/height ratio=1/2) slope, a horizontal-down (width/height ratio=2) slope, and a horizontal-up (width/height ratio=2) slope. In addition, the feature vectors may vary depending on the kind of the intra mode to be used, such as the intra 16×16 mode.

Meanwhile, the feature vector distribution is generated by classifying feature vectors of image blocks with respect to each intra mode by employing a learning module (not shown) using a Bayesian classifier.

The learning module obtains input feature vectors to be used in the Bayesian classifier, that is, information required by the Bayesian classifier, by using adjacent reference pixels of a block to be encoded with respect to a image sequence for setting the feature vector distribution. As described above, the feature vectors may include the vertical slope defined as the total sum of vertical differences of the adjacent pixels of the block to be encoded, the horizontal slope defined as the total sum of horizontal differences thereof, the diagonal down-left slope defined as the total sum of diagonal differences thereof, the diagonal down-right slope, the horizontal-down (width/height ratio=1/2) slope, the horizontal-up (width/height ratio=1/2) slope, the horizontal-down (width/height ratio=2) slope, and the horizontal-up (width/height ratio=2) slope, as the feature components of the feature vectors. If the allowable value range of the feature component is too large, the value can be quantized.

In this case, the slope may be acquired from the mean difference value among n adjacent pixels in the corresponding direction (where n is an integer greater than 1). For example, in a case where there are pixels of a current block and pixels of a neighboring block (or adjacent block, i.e., upper block in FIG. 6) as shown in FIG. 6, the slope is obtained from the difference between two adjacent pixels, and thereby the vertical slope may be [$(A_1-A_0)$, $(B_1-B_0)$, $(C_1-C_0)$, $(D_1-D_0)$] or the mean value of $(A_1-A_0)$, $(B_1-B_0)$, $(C_1-C_0)$, $(D_1-D_0)$. The slope is also obtained from the difference among three adjacent pixels by using [$(A_2-A_0)$, $(B_2-B_0)$, $(C_2-C_0)$, $(D_2-D_0)$], but the present disclosure is not limited thereto.

The slope obtained as described above may be a feature component of one feature vector x ($x_0, x_1, \ldots, x_{m-1}$). In this case, m represents the number of feature components constituting the feature vector. Therefore, when all slopes of eight directions are obtained, the feature vector x becomes a feature vector constituted by eight feature components. It is apparent that the present disclosure may further expand the range of the reference pixels or use features other than the slope.

The learning module obtains an optimal intra mode of each image block by performing rate-distortion optimization (RDO), stores feature vectors obtained for the obtained intra mode, and stores the feature vectors for each intra mode of all blocks on the image sequence for setting the feature vector distribution to store the same as the feature vector distribution for each intra mode.

The feature vector extractor 581 extracts the feature vector from the pixels of the neighboring block by using the method that is substantially similar to the feature vector extraction method of the learning module.

The prediction mode encoder 582 extracts the optimal prediction mode represented by the feature vector extracted by the feature vector extractor 581 with reference to the preset feature vector distribution of the image set by the learning module, and encodes the extracted optimal prediction mode as the prediction mode for the intra mode.

The optimal prediction mode represented by the extracted feature vector can be obtained by the prediction mode encoder 582 from Equation (1) below.

$$\text{If } k = \operatorname*{argmax}_{i} P(w_i \mid x), x \text{ is classified to } w_k \qquad \text{Equation (1)}$$

As expressed in Equation (1), the prediction mode encoder 582 calculates intra mode possibilities $P(w_i|x)$ for available intra modes ($w_i$) with respect to x with reference to the feature vector distribution by using the extracted feature vector. The prediction mode encoder 582 calculates an intra mode i having the greatest value among the possibilities $P(w_i|x)$, and encodes the same as the most probable mode (MPM) or the prediction mode for the intra mode.

Therefore, the prediction mode encoder 582 obtains the intra mode for the current block by using rate-distortion optimization (RDO). The prediction mode encoder 582 encodes the intra mode into 1 bit when the MPM obtained by the above-described method is identical to the intra mode used for the prediction of the current block, and encodes the intra mode into 4 bits when the MPM obtained by the above-described method is not identical to the intra mode used for the prediction of the current block.

Figure 7:
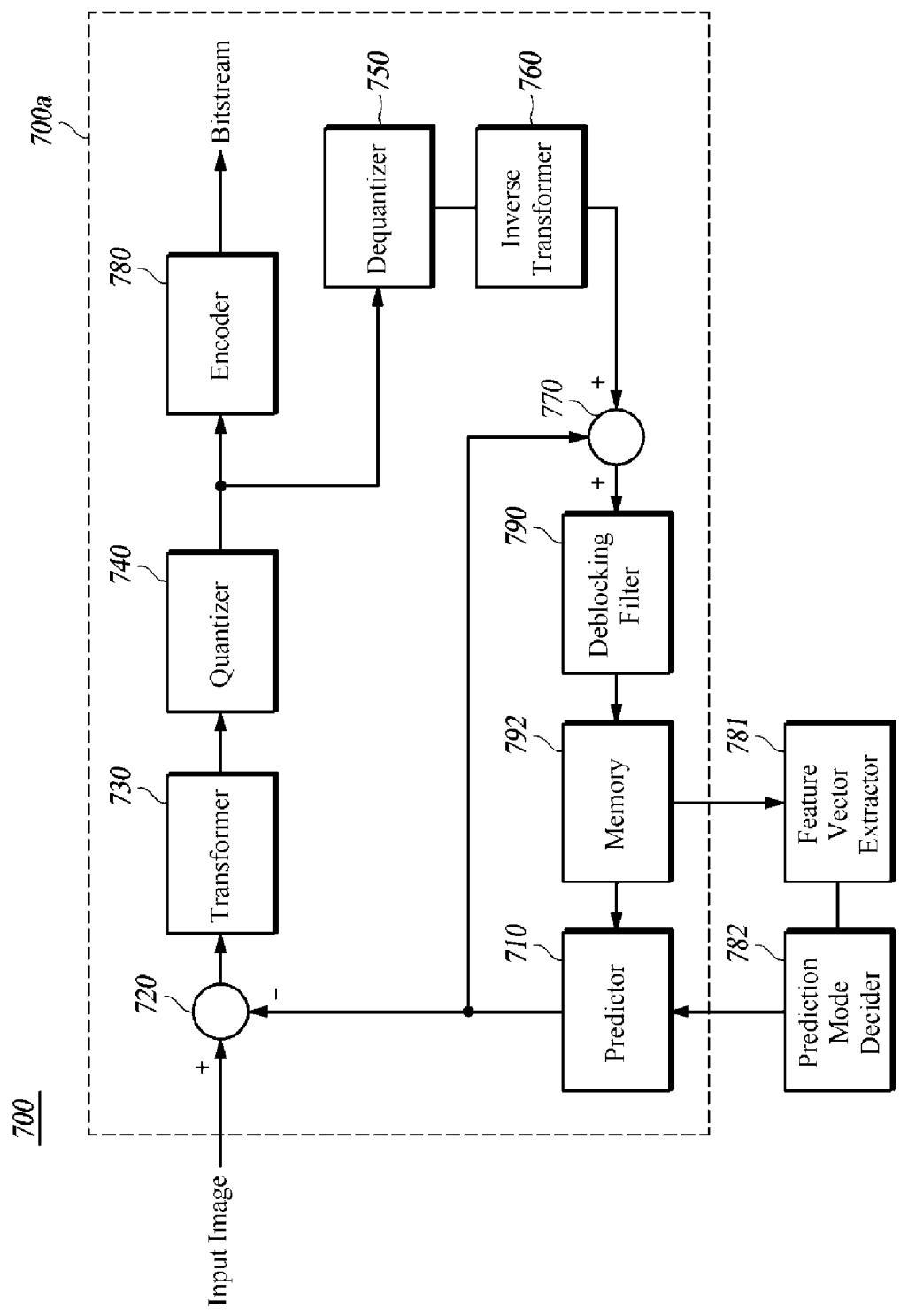
FIG. 7 is a schematic block diagram of a configuration of a video encoding apparatus according to at least another embodiment of the present disclosure.

FIG. 7 is a schematic block diagram of a configuration of a video encoding apparatus according to at least another embodiment of the present disclosure.

Referring to FIG. 7, the video encoding apparatus 700 may include a predictor 710, a subtractor 720, a transformer 730, a quantizer 740, a dequantizer 750, an inverse transformer 760, an adder 770, an encoder 780, a feature vector extractor 781, a prediction mode decider 782, a deblocking filter 790, and a memory 792. A part of the above elements may not be necessarily included in the video encoding apparatus 700, and all or part of the above elements may be selectively included in the video encoding apparatus 700, depending on implementation. Meanwhile, an intra prediction encoder 700a according to one or more embodiments of the present disclosure performs an intra prediction and encoding on a current block by using pixels of at least one neighboring block adjacent to the current block. The intra prediction encoder 700a may be configured with the predictor 710, the subtractor 720, the transformer 730, the quantizer 740, the dequantizer 750, the inverse transformer 760, the adder 770, the encoder 780, the deblocking filter 790, and the memory 792. Other components of the video encoding apparatus 700, such as a predictor 710, a subtractor 720, a transformer 730, a quantizer 740, a dequantizer 750, an inverse transformer 760, an adder 770, an encoder 780, a feature vector extractor 781, a prediction mode decider 782, and a deblocking filter 790 are implemented by one or more processors and/or application-specific integrated circuits (ASICs).

The operations of the predictor 710, subtractor 720, transformer 730, quantizer 740, dequantizer 750, inverse transformer 760, adder 770, encoder 780, deblocking filter 790 and memory 792 may have the functions identical or similar to those of the predictor 510, subtractor 520, transformer 530, quantizer 540, dequantizer 550, inverse transformer 560, adder 570, encoder 580, deblocking filter 590 and memory 592 of the video encoding apparatus 500 according to one or more embodiments of the present disclosure.

The prediction mode decider 782 decides an optimal prediction mode represented by the feature vector as the intra mode of the current block with reference to the preset feature vector distribution of the image blocks. Since the method for deciding the intra mode in the prediction mode decider 782 is substantially identical to the method for deciding the MPM in the prediction mode encoder 582 of FIG. 5, a detailed description thereof will be omitted for description convenience.

The predictor 710 of the video encoding apparatus 700 according to another embodiment of the present disclosure is different from the predictor 510 of FIG. 5 in that the intra mode is decided in the prediction mode decider 782, whereas the predictor 510 of FIG. 5 decides the optimal intra mode. Since the others may perform the same operations, further detailed description will be omitted.

Figure 8:
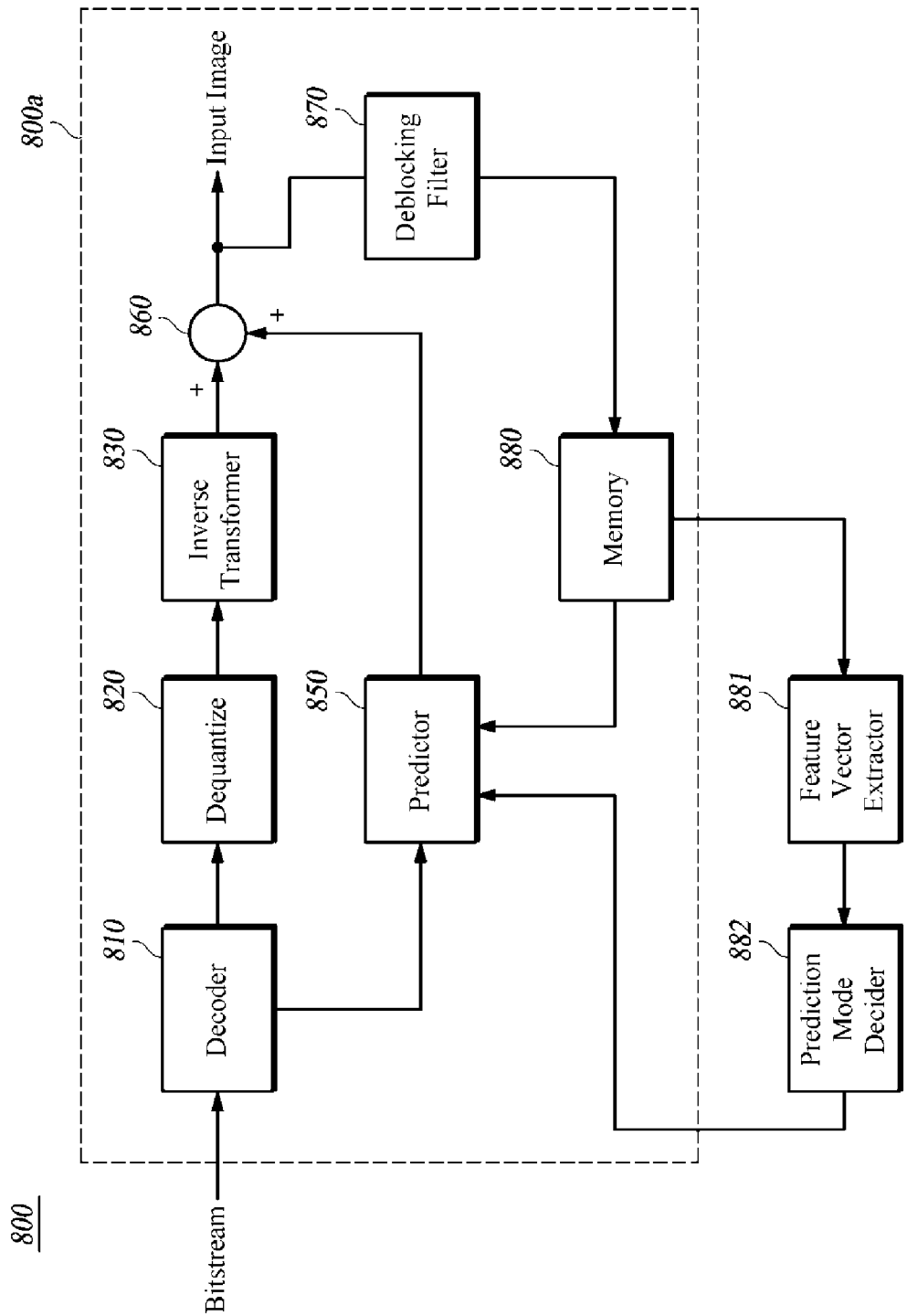
FIG. 8 is a schematic block diagram of a configuration of a video decoding apparatus according to one or more embodiments of the present disclosure.

FIG. 8 is a schematic block diagram of a configuration of a video decoding apparatus according to one or more embodiments of the present disclosure.

The video decoding apparatus 800 according to one or more embodiments of the present disclosure may include a decoder 810, a dequantizer 820, an inverse transformer 830, a predictor 850, an adder 860, a deblocking filter 870, a memory 880, a feature vector extractor 881, and a prediction mode decider 882. An intra prediction decoder 800a according to one or more embodiments of the present disclosure may include the decoder 810, the dequantizer 820, the inverse transformer 830, the predictor 850, the adder 860, the deblocking filter 870, and the memory 880. Other components of a decoder 810, a dequantizer 820, an inverse transformer 830, a predictor 850, an adder 860, a deblocking filter 870, a feature vector extractor 881, and a prediction mode decider 882 are implemented by one or more processors and/or application-specific integrated circuits (ASICs).

The decoder 810 may extract a quantized frequency coefficient string by decoding a bitstream and generate a residual block having quantized frequency coefficients by inversely scanning the quantized frequency coefficient string.

Since the dequantizer 820 and the inverse transformer 830 perform the functions identical or similar to those of the dequantizer 550 and the inverse transformer 560 described above with reference to FIG. 5, a detailed description thereof will be omitted for description convenience.

The feature vector extractor 881 extracts feature vectors from pixels of an neighboring block. Since the operation of the feature vector extractor 881 is identical or similar to that of the feature vector extractor 581 of FIG. 5, a detailed description thereof will be omitted for description convenience.

The prediction mode decider 882 decides an optimal prediction mode represented by the extracted feature vector as the intra mode of the current block with reference to the preset feature vector distribution of the image blocks. Since the operation of the prediction mode decider 882 is identical or similar to that of the prediction mode decider 782 of FIG. 7, a detailed description thereof will be omitted for description convenience.

The predictor 850 generates a predicted block by using an intra prediction mode extracted from a bitstream or by using an intra prediction mode decided by the prediction mode decider 882.

The adder 860 reconstruct a target block by adding the predicted block generated by the predictor 850 and a residual block reconstructed by the inverse transformer 830. The reconstructed target block is deblocking-filtered by the deblocking filter 870 and is then stored in the memory 880. Thus, the deblocking-filtered target block may be used as a reference picture when a next block of the target block or other blocks are reconstructed. The deblocking-filtering of the reconstructed target block is to remove block distortion inherent in the reconstructed target block.

An image encoding and decoding apparatus according to one or more embodiments of the present disclosure can be implemented by connecting a bitstream output terminal of the video encoding apparatus of FIG. 5 or 7 to a bitstream input terminal of the video decoding apparatus 800 of FIG. 8 according to one or more embodiments of the present disclosure.

The video encoding and decoding apparatus according to one or more embodiments of the present disclosure includes a video encoder configured to extract a feature vector from pixels of neighboring block (i.e., adjacent pixels), extract an optimal prediction mode represented by the feature vector with reference to a preset feature vector distribution of image blocks, decide the extracted optimal prediction mode as an MPM or an intra mode of a current block, and perform an intra prediction and encoding on the current block by using pixels of the neighboring block adjacent to the current block. The video encoding and decoding apparatus also includes a video decoder configured to generate a predicted block either by using an intra prediction mode extracted from a bitstream or by extracting a feature vector from pixels of neighboring block and using, as the intra prediction mode, an optimal prediction mode represented by the extracted feature vector with reference to a preset feature vector distribution of image blocks, and to reconstruct the current block.

In this case, the video encoder can be implemented with the video encoding apparatus of FIG. 5 or 7, and the video decoder can be implemented with the video decoding apparatus of FIG. 8.

A video encoding method according to one or more embodiments of the present disclosure includes: an intra prediction encoding step (S910) of performing an intra prediction and encoding on a current block by using pixels of at least one neighboring block adjacent to the current block; a feature vector extracting step (S920) of extracting a feature vector from pixels of a neighboring block; and a prediction mode encoding step (S930) of extracting an optimal prediction mode represented by the feature vector with reference to a preset feature vector distribution of image blocks, and encoding the optimal prediction mode as a prediction mode for an intra mode.

Since the intra prediction encoding step (S910), feature vector extracting step (S920), and prediction mode encoding step (S930) correspond to the operations of the intra prediction encoder 500*a*, feature vector extractor 581, and prediction mode encoder 582, respectively, detailed descriptions thereof will be omitted. The above described steps S910~S930 are not shown.

A video encoding method according to at least another embodiment of the present disclosure includes: a feature vector extracting step (S1010) of extracting a feature vector from pixels of a neighboring block; a prediction mode deciding step (S1020) of deciding an optimal prediction mode represented by the feature vector as an intra mode of a current block with reference to a preset feature vector distribution of image blocks; and an intra prediction encoding step (S1030) of performing an intra prediction and encoding in the intra mode by using pixels of the neighboring block adjacent to the current block. The above described steps S1010~S1030 are not shown.

Since the feature vector extracting step (S1010), prediction mode deciding step (S1020) and intra prediction encoding step (S1030) correspond to the operations of the feature vector extractor 781, prediction mode decider 782 and intra prediction encoder 700*a*, respectively, detailed descriptions thereof will be omitted.

A video decoding method according to one or more embodiments of the present disclosure includes: a feature vector extracting step (S1110) of extracting a feature vector from pixels of a neighboring block; a prediction mode deciding step (S1120) of deciding an optimal prediction mode represented by the feature vector as an intra mode of a current block with reference to a preset feature vector distribution of image blocks; and an intra prediction decoding step (S1130) of generating a predicted block by performing intra prediction in the intra mode by using the pixels of the neighboring block adjacent to the current block, and reconstructing the current block.

Since the feature vector extracting step (S1110), prediction mode deciding step (S1120) and intra prediction decoding step (S1130) correspond to the operations of the feature vector extractor 881, prediction mode decider 882 and intra prediction decoder 800*a*, detailed descriptions thereof will be omitted. The above described steps S1010~S1130 are not shown.

The video encoding and decoding method according to one or more embodiments of the present disclosure can be implemented by integrating the video encoding method according to one or more embodiments of the present disclosure or the video encoding method according to at least another embodiment of the present disclosure and the video decoding method according to one or more embodiments of the present disclosure.

The video encoding and decoding method according to one or more embodiments of the present disclosure includes: a video encoding step which includes extracting a feature vector from pixels of a neighboring block, extracting an optimal prediction mode represented by the feature vector with reference to a preset feature vector distribution of image blocks, deciding the extracted optimal prediction mode as an MPM or an intra mode of a current block, and performing an intra prediction and encoding on the current block by using pixels of the neighboring block adjacent to the current block. The video encoding/decoding method also includes a video decoding step which includes generating a predicted block either by using an intra prediction mode extracted from a bitstream or by extracting a feature vector from pixels of the neighboring block and using, as the intra prediction mode, an optimal prediction mode represented by the feature vector with reference to a preset feature vector distribution of the image blocks, and reconstructing the current block.

As described above, the present disclosure is highly useful for application in the fields of encoding efficiency of mode information by predicting an intra mode by using feature vectors of a neighboring block, leading to an increase in prediction success possibility. According to the present disclosure as described above, prediction success possibility can be increased by predicting an intra mode by using feature vectors of a neighboring block, leading to an improvement in the encoding efficiency of mode information. Furthermore, in a similar manner to an encoding process, a decoding process predicts an intra mode by using feature vectors of a neighboring block. Therefore, an encoded bitstream can be decoded. In addition, in a case where the intra mode is decided by using feature vectors of a neighboring block, the encoding of the intra mode can be omitted.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the essential characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have not been described for limiting purposes. Accordingly, the scope of the claimed invention is not to be limited by the above embodiments but by the claims and the equivalents thereof.

The invention claimed is:

1. A video encoding apparatus, comprising:
an intra prediction encoder configured to determine an intra mode of a current block from among a plurality of intra modes, and
perform an intra prediction and encoding on the current block based on the intra mode of the current block by using pixels of at least one neighboring block adjacent to the current block;
a feature vector extractor configured to generate a feature vector from pixels of the at least one neighboring block, wherein the feature vector is generated from a plurality of differences between values of adjacent pixels of the at least one neighboring block, respective differences of the plurality of differences are calculated based on values of the adjacent pixels located in respective directions of a plurality of directions, the feature vector includes a plurality of elements, and respective elements of the plurality of elements correspond to respective differences of the plurality of differences; and
a prediction mode encoder configured to extract, from a preset feature vector distribution, a prediction mode identified by the feature vector, the preset feature vector distribution including respective feature vectors for respective intra modes, and
encode the identified prediction mode as a most probable mode (MPM) for the intra mode of the current block,
wherein the MPM is used for predicting the intra mode of the current block, and a length of encoded data for indicating the intra mode of the current block is determined according to whether the intra mode of the current block is equal to the MPM.

2. The video encoding apparatus of claim 1, wherein the plurality of directions are determined from directions including a vertical direction, a horizontal direction, a diagonal down-right direction, a diagonal down-left direction, a horizontal-down (width/height ratio=1/2) direction, a horizontal-up (width/height ratio=1/2) direction, a horizontal-down (width/height ratio=2) direction, and a horizontal-up (width/height ratio=2) direction.

3. A video decoding apparatus, comprising:
a feature vector extractor configured to generate a feature vector from pixels of at least one neighboring block adjacent to a current block, wherein the feature vector is generated from a plurality of differences between values of adjacent pixels of the at least one neighboring block, respective differences of the plurality of differences are calculated based on values of the adjacent pixels located in respective directions of a plurality of directions, the feature vector includes a plurality of elements, and respective elements of the plurality of elements correspond to respective differences of the plurality of differences;
a prediction mode processor configured to extract, from a preset feature vector distribution, a prediction mode identified by the feature vector, the preset feature vector distribution including respective feature vectors for respective intra modes,
decide the extracted prediction mode as a most probable mode (MPM) for an intra mode of the current block, wherein the MPM is used for predicting the intra mode of the current block, and a length of encoded data for indicating the intra mode of the current block is determined according to whether the intra mode of the current block is equal to the MPM; and
an intra prediction decoder configured to generate a predicted block by performing an intra prediction based on the intra mode by using pixels of the at least one neighboring block to reconstruct the current block.

4. The video decoding apparatus of claim 3, wherein the plurality of directions are determined from directions including a vertical direction, a horizontal direction, a diagonal down-right direction, a diagonal down-left direction, a horizontal-down (width/height ratio=1/2) direction, a horizontal-up (width/height ratio=1/2) direction, a horizontal-down (width/height ratio=2) direction, and a horizontal-up (width/height ratio=2) direction.

5. A video encoding method performed by a video encoding apparatus, comprising:
determining an intra mode of a current block from among a plurality of intra modes;
performing an intra prediction and encoding on the current block based on the intra mode of the current block by using pixels of at least one neighboring block adjacent to the current block;
generating a feature vector from pixels of the at least one neighboring block, wherein the feature vector is generated from a plurality of differences between values of adjacent pixels of the at least one neighboring block, respective differences of the plurality of differences are calculated based on values of the adjacent pixels located in respective directions of a plurality of directions, the feature vector includes a plurality of elements, and respective elements of the plurality of elements correspond to respective differences of the plurality of differences;
extracting, from a preset feature vector distribution, a prediction mode identified by the feature vector, the preset feature vector distribution including respective feature vectors for respective intra modes; and
encoding the identified prediction mode as a most probable mode (MPM) for the intra mode of the current block,
wherein the MPM is used for predicting the intra mode of the current block, and a length of encoded data for indicating the intra mode of the current block is determined according to whether the intra mode of the current block is equal to the MPM.

6. The video encoding method of claim 5, wherein the plurality of directions are determined from directions including a vertical direction, a horizontal direction, a diagonal down-right direction, a diagonal down-left direction, a horizontal-down (width/height ratio=1/2) direction, a horizontal-up (width/height ratio=1/2) direction, a horizontal-down (width/height ratio=2) direction, and a horizontal-up (width/height ratio=2) direction.

7. A video decoding method performed by a video decoding apparatus, comprising:
generating a feature vector from pixels of at least one neighboring block adjacent to a current block, wherein the feature vector is generated from a plurality of differences between values of adjacent pixels of the at least one neighboring block, respective differences of the plurality of differences are calculated based on values of the adjacent pixels located in respective directions of a plurality of directions, the feature vector including a plurality of elements, and respective elements of the plurality of elements corresponding to respective differences of the plurality of difference;
extracting, from a preset feature vector distribution, a prediction mode identified by the feature vector, the preset feature vector distribution including respective feature vectors for respective intra modes;
deciding the extracted prediction mode as a most probable mode (MPM) for an intra mode of the current block, wherein the MPM is used for predicting the intra mode of the current block, and a length of encoded data for indicating the intra mode of the current block is determined according to whether the intra mode of the current block is equal to the MPM; and
generating a predicted block of the current block by performing an intra prediction based on the intra mode by using pixels of the at least one neighboring block to thereby reconstruct the current block.

8. The video decoding method of claim 7, wherein the plurality of directions are determined from directions including a vertical direction, a horizontal direction, a diagonal down-right direction, a diagonal down-left direction, a horizontal-down (width/height ratio=1/2) direction, a horizontal-up (width/height ratio=1/2) direction, a horizontal-down (width/height ratio=2) direction, and a horizontal-up (width/height ratio=2) direction.

* * * * *